Figure 1:
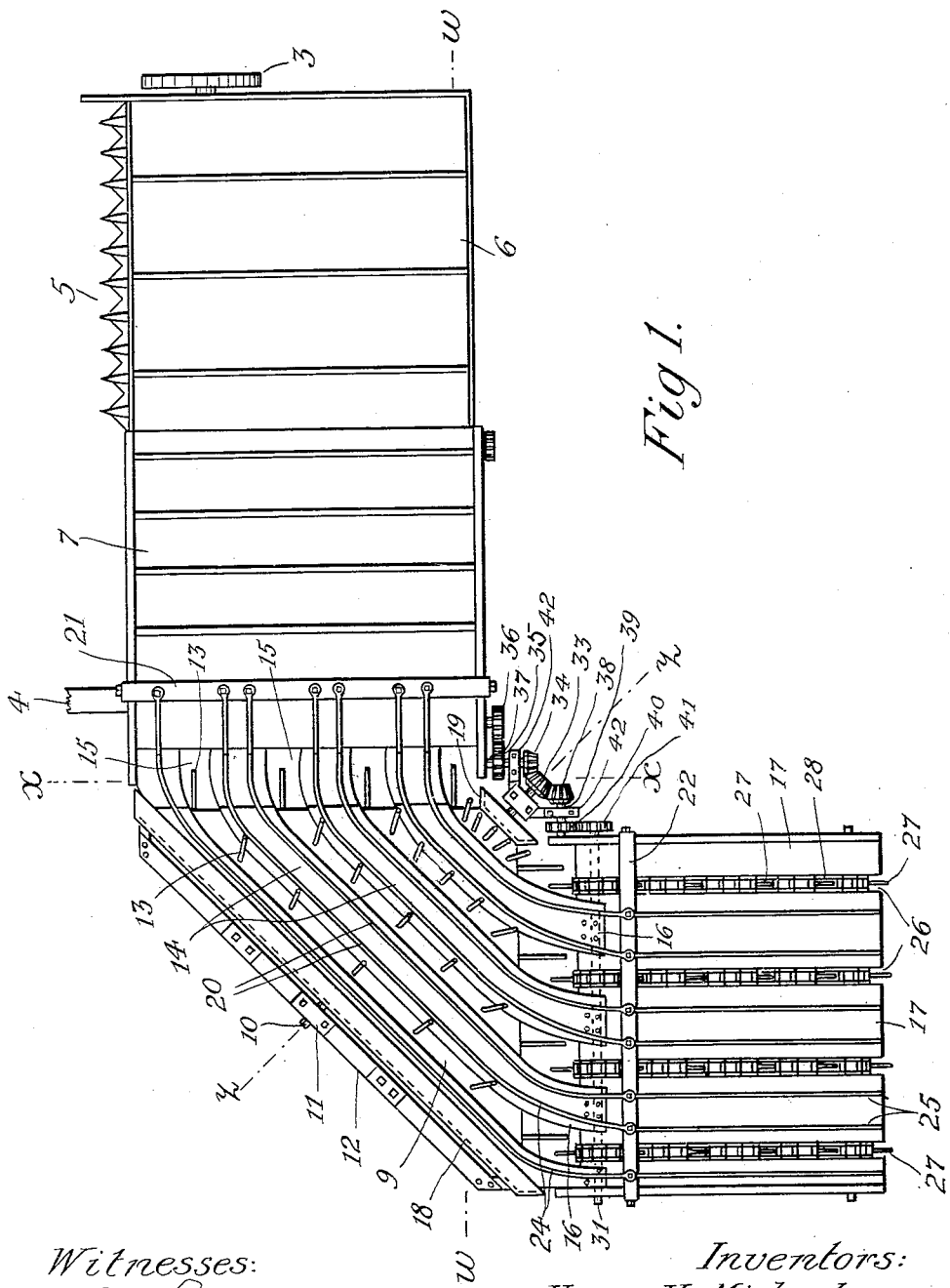

No. 738,223. PATENTED SEPT. 8, 1903.
H. H. & N. O. MICHAELSON.
GRASS HARVESTER.
APPLICATION FILED APR. 16, 1903.
NO MODEL. 3 SHEETS—SHEET 1.

Witnesses:
Theo. Lagaard
H. A. Bowman

Inventors:
Henry H. Michaelson.
Nick O. Michaelson.
By P. H. Gunckel
their Attorney.

No. 738,223. PATENTED SEPT. 8, 1903.
H. H. & N. O. MICHAELSON.
GRASS HARVESTER.
APPLICATION FILED APR. 16, 1903.
NO MODEL. 3 SHEETS—SHEET 2.

Witnesses
Theo. Lagaard
H. A. Bowman

Inventors
Henry H. Michaelson
Nick O. Michaelson
By P. H. Gunckel
their Attorney.

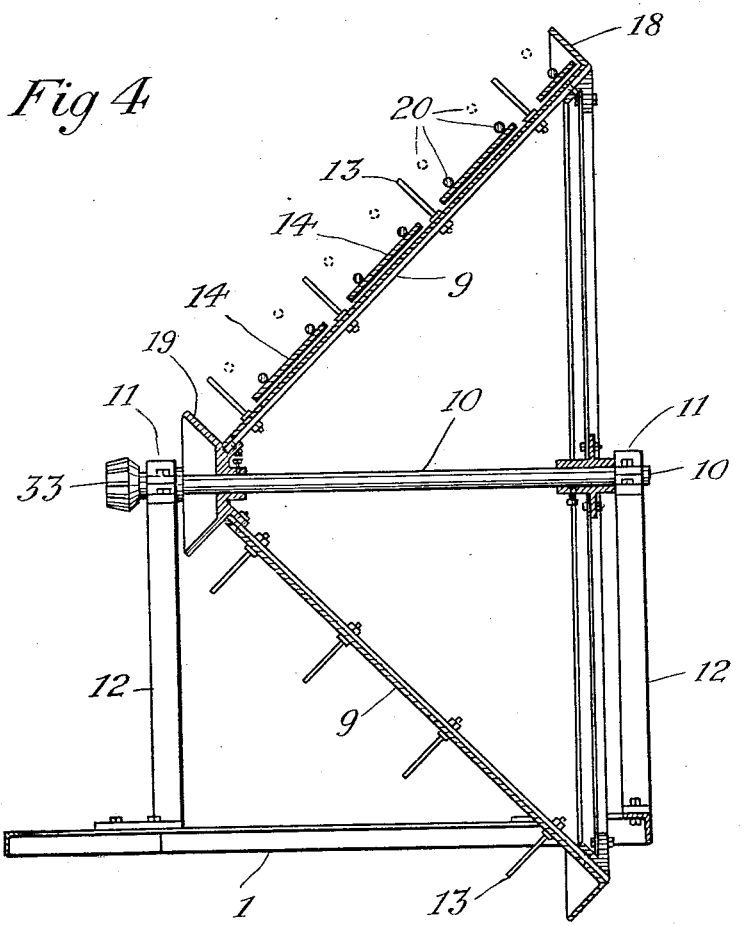

No. 738,223. Patented September 8, 1903.

UNITED STATES PATENT OFFICE.

HENRY H. MICHAELSON AND NICK O. MICHAELSON, OF OSSEO, MINNESOTA.

GRASS-HARVESTER.

SPECIFICATION forming part of Letters Patent No. 738,223, dated September 8, 1903.

Application filed April 16, 1903. Serial No. 152,846. (No model.)

*To all whom it may concern:*

Be it known that we, HENRY H. MICHAELSON and NICK O. MICHAELSON, citizens of the United States, residing at Osseo, county of Hennepin, and State of Minnesota, have jointly invented certain new and useful Improvements in Grass-Harvesters, of which the following is a specification.

Our invention relates to harvesting-machines, and particularly to the machines of that class used for harvesting grass; and its object is to provide an attachment to an ordinary harvester whereby the grass or grain will be conveyed from the elevator and straightened and turned at right angles and in such position dropped to the ground, so that the stems of the grass or grain in the windrow will lie transversely to the windrow instead of parallel with it.

The special purpose of such improvement is to improve the means for harvesting grass for use in manufacturing twine and other articles. The grass used for such purposes is usually marketed in bundles or sheaves similar to wheat sheaves; but it is not practicable to bind it at the time it is cut, for the reason that it should be dried as hay is dried or cured before being bound. It is also important that the grass should not be in tangled condition and the butts of the stalks should be at the same end of the bundle; but if the grass when cut is dropped to the ground with the stalks lying parallel with the direction of movement of the machine, whether in windrows or not, it is impossible to turn it without tangling it, and it is difficult and requires careful manual labor to gather it into bundles with the butts even and at the same end. If, however, the grass is laid on the ground in windrows, with the stems extending transversely and the butts all at one side, it is an easy matter to turn it when necessary in drying and to gather it in bundles either by hand or by machine.

The main features of the improved attachment comprise a rotary cone-shaped grass-carrier set in position to receive at one side the discharge from the elevator, curved guards and guides for directing the course of the grass as it is being moved by the conical carrier, and a suitable carrier for conducting the grass from the opposite side of the cone to the ground.

Our improvements are illustrated in the accompanying drawings, in which—

Figure 3:
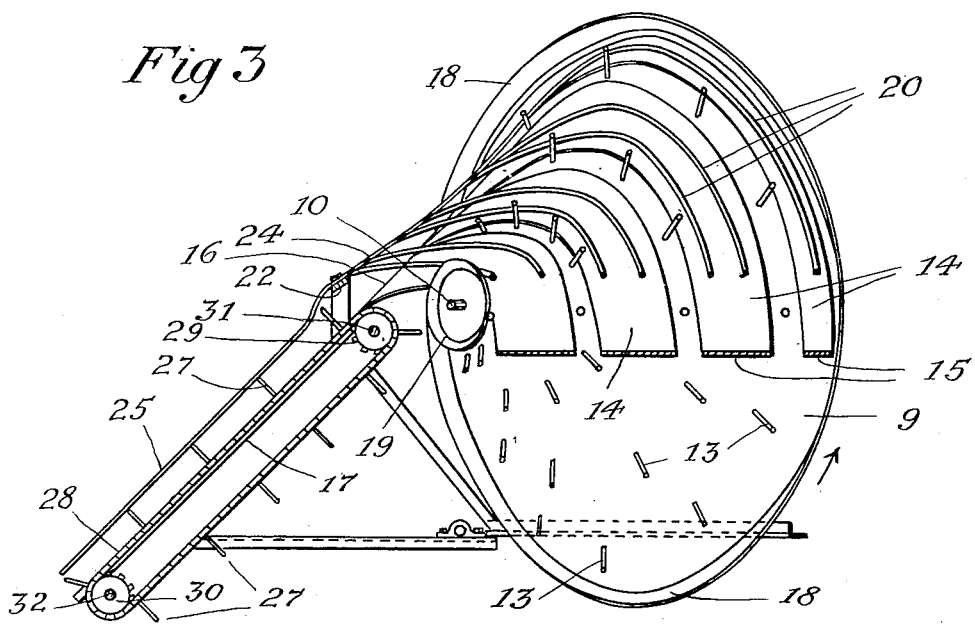
Figure 2:
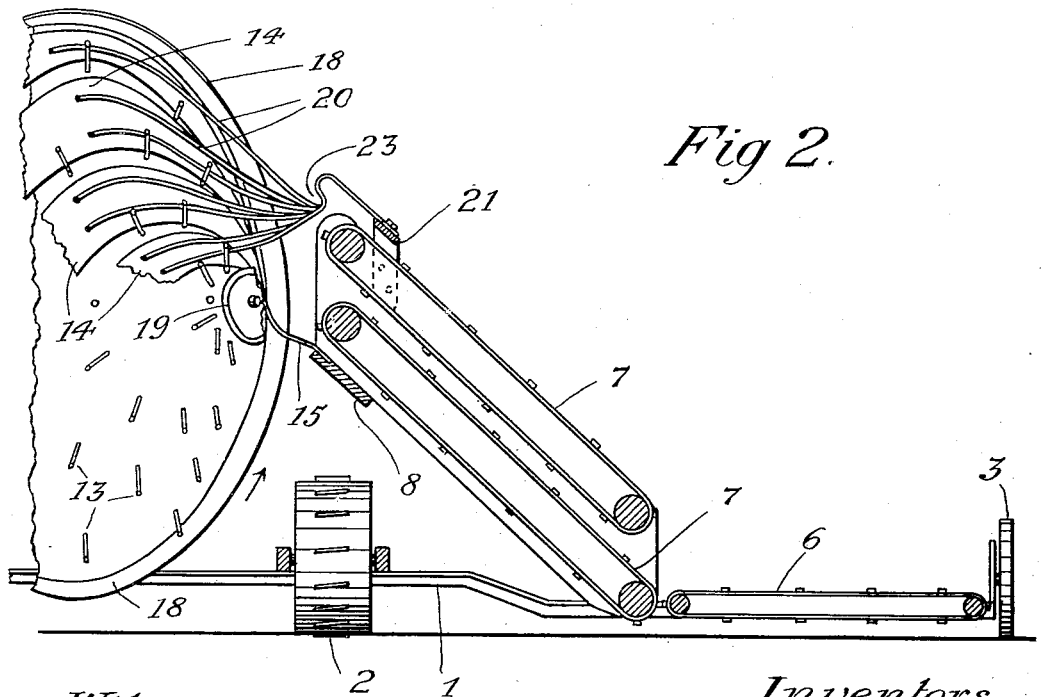

Figure 1 is a plan view of a portion of an ordinary harvester, showing the grain cutting and conveying devices with our improvements connected thereto. Fig. 2 is a rear elevation of the same, partly in section, on the line *w w* of Fig. 1. Fig. 3 is a sectional elevation on the line *x x* of Fig. 1, and Fig. 4 is a sectional view on the line *z z* of Fig. 1.

In the drawings, 1 designates a portion of the main frame; 2, the main wheel; 3, the grain-wheel; 4, the draft-pole; 5, the cutter-bar; 6, the platform-canvas for conveying the grass to the elevator; 7, the elevator, and 8 a portion of the elevator-frame of a harvester of well-known construction.

Our attachments are located adjacent to the discharge-opening of the elevator in the space usually occupied by the binding mechanism. A cone-shaped conveyer 9 is placed with its axis 10 in horizontal position and its apex toward the rear of the machine and with one of its sides adjacent to and parallel with the horizontal discharge-opening of the elevator. The axis 10 is supported in journal-boxes 11 on a supplemental frame 12, that is secured on the main frame. The faces of the cone are provided with prongs or studs 13, arranged at suitable intervals and in circumferential rows. Intermediate these rows of prongs and slightly above the upper face of the cone are stationary guides 14, corresponding in curvature with the sections of the cone they cover to provide surfaces on which the grass is carried along by the prongs 13. The inner end portions 15 of these guides are secured to the elevator-frame 8 beneath the elevator-discharge, and their outer end portions 16 are secured to the upper surface of the inclined discharging-platform 17, that serves to direct the grass to the ground. Flanges 18 and 19, respectively, may be provided around the base and apex of the cone to serve as guards to prevent the grass from slipping off the guides 14 in the direction of the cone base or apex, or the same result may be accomplished by similarly-curved guards permanently secured to the frames 8 and 17 and arranged to occupy the positions of the corresponding upper portions of the flanges 18 and 19.

To hold the grass down to the surfaces of the guides 14 there is provided over each of them one or more spring press-rods 20, which may be made of heavy wires bent to proper shape and having their ends attached to cross-bar 21 and 22, respectively, provided above the elevator-frame 8 and the platform 17. These press-rods should be so bent adjacent to the elevator 7, as indicated at 23, as to coöperate with the prongs 13 in conducting the grass to the guides 14 and so shaped, as indicated at 24, adjacent to the platform 17 as to aid in properly delivering the grass to the discharging-conveyer, and they should be so shaped and fastened to their supports as to exert a constant torsional or spring pressure in downward direction toward the guides 14.

For properly holding the grass on the inclined surface of the platform 17 press-rods 25, extending lengthwise of the platform, are secured to the cross-bar 22 and exert spring-pressure toward the platform. The latter is slotted in longitudinal direction, as at 26, to provide free passage of the prongs 27 on the endless conveyer chains or belts 28, which are operated by the sprocket wheels or rollers 29 and 30. These wheels or rollers are on shafts 31 and 32, respectively, that are revolubly supported in suitable bearings beneath the platform 17.

To operate the cone 9, its axis may have at its rear end a miter-gear 33, meshing with a corresponding miter-gear 34 on a short shaft 35, driven from one of the shafts of the elevator 7 by means of gear-wheels 36 and 37. To operate the sprocket-wheel shaft 31, a miter-gear 38 is engaged by the corresponding gear 33 and turns a shaft 39, which carries a pinion 40, engaging a gear 41 on the shaft 31 for driving it. The shafts 35 and 39 are journaled in boxes 42, mounted on the framework. By these means the cone and the sprocket-chains are operated in the directions necessary to conduct the grass in the desired onward course.

The operation of the mechanism is as follows: The grass as it is carried up by the elevator lies with its butts toward the front and its stems extending across the elevator toward the rear of the machine, and it is delivered in such position at the elevator-discharge and is there engaged by the prongs of the cone and moved to the guides 14. Here it is retarded somewhat by the downward pressure of the press-rods 20, so that the action of the rows of prongs tends to assemble the individual stems of grass into bunches, and thereby press them into parallel positions. When these bunches reach the ends of the guides, they are caught by the prongs of the chains 28 and are carried downward on the platform to a point near the ground, being in the meantime held in proper order by the pressure of the rods 25 until dropped to the ground.

Having described our invention, what we claim, and desire to secure by Letters Patent, is—

1. In a grass-harvester, the combination with the elevator, of a mechanism arranged to receive the discharge therefrom and adapted to turn the stems of the grass to positions at right angles to the direction of movement of the harvester, and a conveyer for conducting the grass rearward and downward and depositing it on the ground in a continuous row wherein the stems lie transversely to the row, substantially as set forth.

2. In a grass-harvester, the combination with the elevator, of a conveying mechanism arranged to receive the discharge therefrom and comprising a cone-shaped conveyer, and in coöperation therewith a downwardly-inclined discharging-conveyer, substantially as set forth.

3. In a grass-harvester, the combination with an elevator for conducting the grass in lateral and upward direction and a conveyer for conducting it rearward and downward, of an intermediate conveyer adapted to turn the grass-stems while in transit to positions at right angles to the direction of movement of the harvester, substantially as set forth.

4. In a grass-harvester, the combination with an elevator for conducting the grass in lateral and upward direction and a conveyer for conducting it rearward and downward, of an intermediate conveyer operating in a curved course to turn the grass-stems while in transit to positions at right angles to the direction of movement of the harvester, substantially as set forth.

5. In a grass-harvester, the combination with an elevator for conducting the grass in lateral and upward direction and a conveyer for conducting it rearward and downward, of an intermediate cone-shaped conveyer provided with prongs, and guiding-surfaces and press-rods for the grass, whereby the grass-stems while in transit are turned to positions at right angles to the direction of movement of the harvester, substantially as set forth.

6. In a grass-harvester, the combination with an elevator extending from the platform in upward and lateral direction, and a conveyer extending rearward and downward, of a series of stationary intermediate curved guiding-surfaces, corresponding press-rods for holding and retarding the grass on the guides, and series of rows of conveyer-prongs operating in correspondingly-curved courses, for the purpose set forth.

In testimony whereof we have signed our names to this specification, in the presence of two subscribing witnesses, this 6th day of April, 1903.

HENRY H. MICHAELSON.
NICK O. MICHAELSON.

Witnesses:
P. H. GUNCKEL,
H. A. BOWMAN.